(No Model.)
J. C. BULLOCK.
MEAT OR VEGETABLE CHOPPER.
No. 536,014. Patented Mar. 19, 1895.
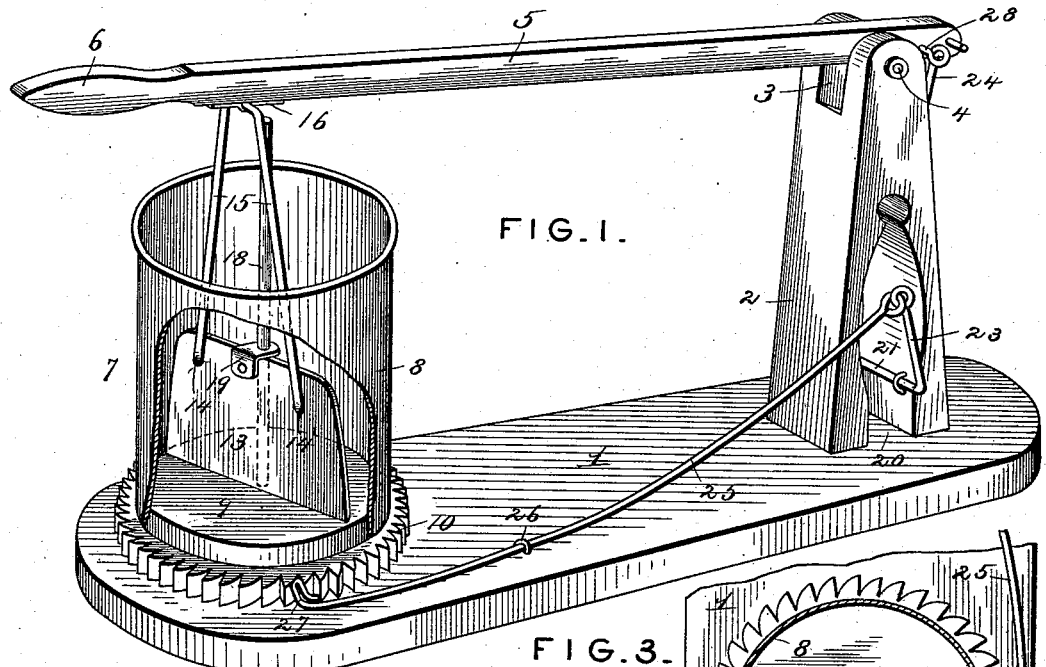
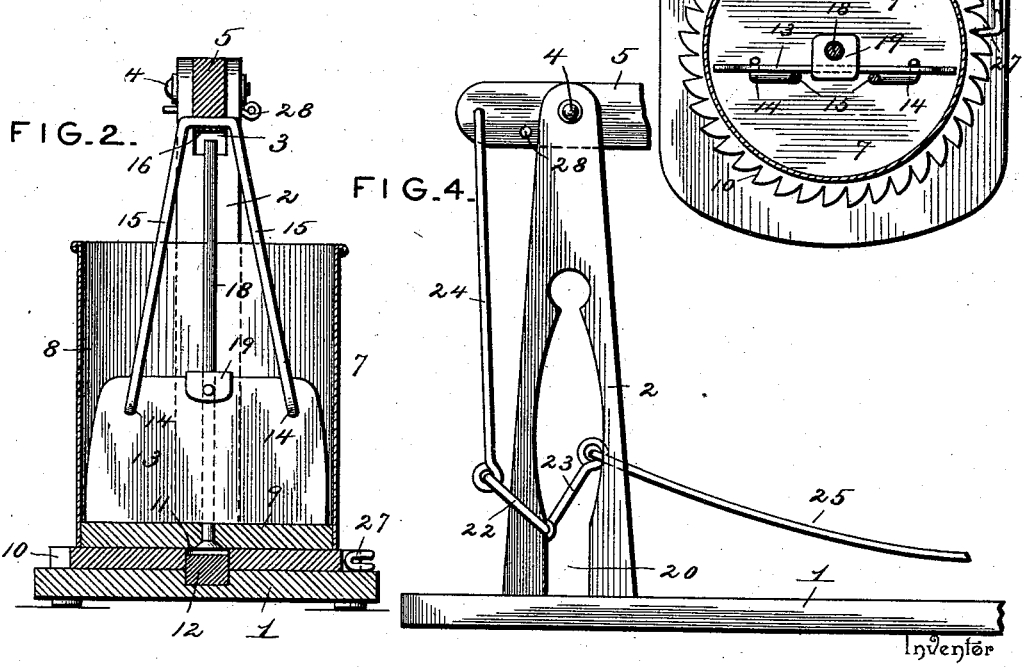
Witnesses
Harry L. Amer
H. J. Riley
By his Attorneys.
Inventor
James C. Bullock.
C. A. Snow & Co.

UNITED STATES PATENT OFFICE.

JAMES CLARENCE BULLOCK, OF READSBOROUGH, VERMONT, ASSIGNOR OF ONE-HALF TO GEORGE M. BEMIS, OF SAME PLACE.

MEAT OR VEGETABLE CHOPPER.

SPECIFICATION forming part of Letters Patent No. 536,014, dated March 19, 1895.

Application filed March 23, 1894. Serial No. 504,825. (No model.)

*To all whom it may concern:*

Be it known that I, JAMES CLARENCE BULLOCK, a citizen of the United States, residing at Readsborough, in the county of Bennington and State of Vermont, have invented a new and useful Meat or Vegetable Chopper, of which the following is a specification.

The invention relates to improvements in meat and vegetable choppers.

The objects of the present invention are to simplify and improve the construction of meat and vegetable choppers, and to provide an inexpensive one capable of rapid and effective operation, with great ease and convenience to the operator.

The invention consists in the construction and novel combination and arrangement of parts hereinafter fully described, illustrated in the accompanying drawings, and pointed out in the claims hereto appended.

In the drawings: Figure 1 is a perspective view of a meat and vegetable chopper constructed in accordance with this invention. Fig. 2 is a transverse sectional view. Fig. 3 is a horizontal sectional view. Fig. 4 is a detail view, illustrating the means for limiting the upward movement of the operating lever.

Like numerals of reference indicate like parts in all the figures of the drawings.

1 designates a base, from one end of which rises a standard 2, and journaled on the upper end of the standard, in a bifurcation 3 thereof, by a transverse pin 4, is an operating lever 5, projecting rearward slightly from the standard and extending forward over and slightly beyond the front end of the base and terminating in a handle 6. On the front portion of the base is rotatably mounted a cylindrical receptacle 7, consisting preferably of a sheet-metal cylinder 8, forming the sides of the receptacle, and a circular wooden bottom 9, having a peripheral rabbet and fitting in the lower end of the cylinder.

The bottom of the receptacle is provided with peripheral teeth 10, and has, on its lower face, a central bearing-socket 11, receiving a vertical journal 12, of the base, and on the journal the receptacle rotates to bring different portions of its contents beneath a vertically-reciprocating knife 13.

The knife 13 is provided with a lower cutting edge which is straight, and which is disposed transversely of the base. The top of the knife is provided with perforations in which are secured the lower bent ends 14 of an inverted V-shaped connecting-frame 15, which is hinged at its upper end to the lower face of the operating lever, whereby, by raising and lowering the operating lever, the knife is vertically reciprocated. The upper end of the V-shaped frame is hinged by means of a plate 16 secured to the lever and provided with an intermediate groove or bend to receive the upper end of the connecting frame.

The receptacle has mounted in it a vertically-bowed, centrally-arranged stem 18, which is round and which serves as a guide for the knife, the latter being provided at its top with a centrally-arranged horizontally-disposed guide-flange 19, having an opening receiving the stem. The lower ends of the inverted V-shaped frame are passed through the perforations of the knife and are bent upward against the opposite sides thereof, thereby providing a simple and efficient attachment of the knife.

The standard 2 is provided, at its lower portion, with an opening 20, and has journaled on it within the opening a transverse rock-shaft 21, provided at its ends with upward-extending arms 22 and 23, arranged at an angle to each other. One of the arms is connected, by means of a vertical rod 24, with the rear end of the operating lever 5, whereby the shaft is rocked simultaneously with the vertical reciprocation of the knife. The vertical connecting rod has its upper end bent at an angle and passed through the operating lever to form a pivot.

The other arm 23 of the rock-shaft is attached to the rear end of a longitudinally-disposed pitman 25, which is guided by an eye 26 of the base, and which is provided at its front end with a pawl 27 engaging with the peripheral teeth of the receptacle, whereby the latter is rotated to bring different portions of its contents successively beneath the blade to subject its contents thoroughly to the action of the knife. The pawl is formed by doubling the connecting rod or pitman 26 at the front end and bending the doubled portion inward at an angle; and it has sufficient play to enable it to pass the inclined faces of the teeth without rotating the receptacle backward.

The upward movement of the knife is limited by a transverse pin 28, extending through the rear portion of the operating lever and projecting from opposite sides thereof and located adjacent to and arranged to engage the standard. This prevents any unnecessary movement on the part of the operator.

It will be seen that the meat and vegetable chopper is simple and comparatively inexpensive in construction, that it is positive and reliable in operation, and that it is capable of effecting a rapid chopping of the contents of the receptacle with a minimum amount of labor on the part of the operator.

Changes in the form, proportion, and the minor details of construction may be resorted to without departing from the principle or sacrificing any of the advantages of this invention.

What I claim is—

1. In a chopper, the combination of a base, a standard rising therefrom, a receptacle rotatively mounted on the base and provided with peripheral teeth and having a vertical stem, an operating lever journaled on the standard, a vertically reciprocating knife guided by the stem and arranged within the receptacle and provided with opposite perforations, an inverted V-shaped frame hingedly connected to the operating lever and having its terminals hooked into the perforations of the knife, a pitman provided with a pawl engaging the peripheral teeth of the receptacle, and a rock shaft connected with the pitman and with the operating lever, substantially as described.

2. In a chopper, the combination of a base, a standard rising therefrom, a receptacle rotatably mounted on the base and provided with peripheral teeth, an operating lever journaled on the standard and extending rearward therefrom, a knife arranged in the receptacle and connected with the operating lever, a rock-shaft journaled on the standard and provided at its ends with arms, a vertical connecting rod having one end attached to one of the arms and its other end connected to the rear end of the lever, and a pitman connected to the other arm of the shaft and provided with a pawl engaging the peripheral teeth of the receptacle, substantially as described.

3. The combination of a base provided with a guide, a standard rising from the base and having an opening, a receptacle rotatably mounted on the base and provided with peripheral teeth, a rock-shaft journaled in the opening of the standard and provided at its end with arms arranged at an angle to each other, an operating lever fulcrumed on the standard and extending rearward therefrom and provided with a stop arranged to engage the standard to limit its upward movement, a knife carried by the lever, a rod connecting one of the arms of the shaft with the rear end of the lever, and a pitman connected to the other arm of the shaft and arranged in the guide of the base and provided with a pawl engaging the peripheral teeth of the receptacle, substantially as described.

In testimony that I claim the foregoing as my own I have hereunto affixed my signature in the presence of two witnesses.

JAMES CLARENCE BULLOCK.

Witnesses:
A. B. CLARK,
W. D. HOWE.